United States Patent
Quan et al.

(10) Patent No.: US 8,804,891 B2
(45) Date of Patent: Aug. 12, 2014

(54) FREQUENCY DETECTOR AND METHOD FOR DETECTING FREQUENCIES

(75) Inventors: Yong Quan, Chengdu (CN); Guosheng Wu, Chengdu (CN)

(73) Assignee: IPGoal Microelectronics (SiChuan) Co., Ltd., Chengdu, Sichuan Province (CN)

( * ) Notice: Subject to any disclaimer, the term of this patent is extended or adjusted under 35 U.S.C. 154(b) by 480 days.

(21) Appl. No.: 13/215,101

(22) Filed: Aug. 22, 2011

(65) Prior Publication Data

US 2012/0134458 A1 May 31, 2012

(30) Foreign Application Priority Data

Nov. 30, 2010 (CN) .......................... 2010 1 0567079

(51) Int. Cl.
*H03D 3/24* (2006.01)
(52) U.S. Cl.
USPC ............ 375/375; 375/376; 375/377; 375/327
(58) Field of Classification Search
USPC ........................................ 375/375, 376, 377
See application file for complete search history.

(56) References Cited

U.S. PATENT DOCUMENTS

2002/0079938 A1* 6/2002 Saeki ............................ 327/165
2011/0181558 A1* 7/2011 Jeon et al. ..................... 345/204

* cited by examiner

*Primary Examiner* — Qutbuddin Ghulamali

(57) ABSTRACT

A frequency detector includes a multi-phase clock generation unit, a sampling unit connected to the multi-phase clock generation unit and a digital logic unit connected to the sampling unit. An inputted single-phase clock is received by the multi-phase clock generation unit and transformed into a multi-phase clock. Inputted random data are received by the sampling unit and sampled by the multi-phase clock. Each data bit of the random data is divided into several sampling intervals according to a phase number of the multi-phase clock. The digital logic unit analyzes sampling values logically, judges the corresponding sampling interval of each sampling value and outputs signals for indicating that a frequency of the random data is higher or lower than the frequency of the single-phase clock based on differences in the corresponding sampling intervals of the sampling values at two adjacent times. A method for detecting frequencies is further provided.

7 Claims, 5 Drawing Sheets

| sampling values | | | | | sampling intervals |
|---|---|---|---|---|---|
| DD4 | D1 | D2 | D3 | D4 | S(N) |
| 0 | 1 | 1 | 1 | 1 | 1 |
| 1 | 0 | 0 | 0 | 0 | 1 |
| 0 | 0 | 1 | 1 | 1 | 2 |
| 1 | 1 | 0 | 0 | 0 | 2 |
| 0 | 0 | 0 | 1 | 1 | 3 |
| 1 | 1 | 1 | 0 | 0 | 3 |
| 0 | 0 | 0 | 0 | 1 | 4 |
| 1 | 1 | 1 | 1 | 0 | 4 |
| others | | | | | S(N−1) |

Fig. 3

FREQUENCY DETECTOR AND METHOD FOR DETECTING FREQUENCIES

BACKGROUND OF THE PRESENT INVENTION

1. Field of Invention

The present invention relates to an electrical system, and more particularly to a frequency detector in a clock data recovery system and a method for detecting frequencies.

2. Description of Related Arts

Frequency detectors are usually for comparing random data frequencies and clock frequencies in some serial communication systems. There are many traditional methods for detecting frequencies, such as comparing by counting and mutual sampling of orthogonal signals.

The method of comparing by counting for detecting frequencies usually takes a long counting period and answers slowly. Besides, it is difficult to accomplish detecting frequencies of the data and the clocks because a quantity of transition edges of the data is different from a quantity of clock. The method of mutual sampling of orthogonal signals for detecting frequencies has relatively bigger errors resulting from fluctuations introduced by the data, and still answers slowly.

SUMMARY OF THE PRESENT INVENTION

Thus, the present invention provides a frequency detector which answers quickly and has small errors in a clock data recovery system and a method for detecting frequencies.

The frequency detector comprises a multi-phase clock generation unit, a sampling unit connected to the multi-phase clock generation unit, and a digital logic unit connected to the sampling unit. The multi-phase clock generation unit receives an inputted single-phase clock and transforms the single-phase clock into a multi-phase clock. The sampling unit receives inputted random data and samples the inputted random data with the multi-phase clock generated by the multi-phase clock generation unit. Each data bit of the random data is divided into several sampling intervals according to a phase number of the multi-phase clock. The digital logic unit logically analyses sampling values outputted by the sampling unit, judges a corresponding sampling interval of each sampling value and outputs signals for indicating that a frequency of the random data is higher or lower than a frequency of the single-phase clock based on differences in corresponding sampling intervals of sampling values at two adjacent times.

A method for detecting frequencies, comprising the following steps:

(1) inputting a single-phase clock to a multi-phase clock generation unit by a clock signal input end;

(2) transforming the single-phase clock into a multi-phase clock by the multi-phase clock generation unit;

(3) inputting random data by a data signal input end, and dividing each data bit of the random data into several sampling intervals according to a phase number of the multi-phase clock;

(4) sampling the random data inputted by the data signal input end by a sampling unit with the multi-phase clock generated by the multi-phase clock generation unit, and outputting each sampling value of each time to a digital logic unit; and (5) logically analyzing the sampling values outputted by the sampling unit through the digital logic unit, judging the corresponding sampling interval of each sampling value, and outputting a signal for indicating a higher or lower frequency based on differences in corresponding sampling intervals of sampling values at two adjacent times.

Compared to the prior art, the frequency detector and the method for detecting frequencies according to the present invention detects frequencies more quickly and has a stronger anti-interference ability and smaller errors.

BRIEF DESCRIPTION OF THE DRAWINGS

FIG. 3 is a sketch view of a state of sampling values and sampling intervals corresponding to the sampling values of the frequency detector according to the preferred embodiment of the present invention.

DETAILED DESCRIPTION OF THE PREFERRED EMBODIMENT

Figure 1:
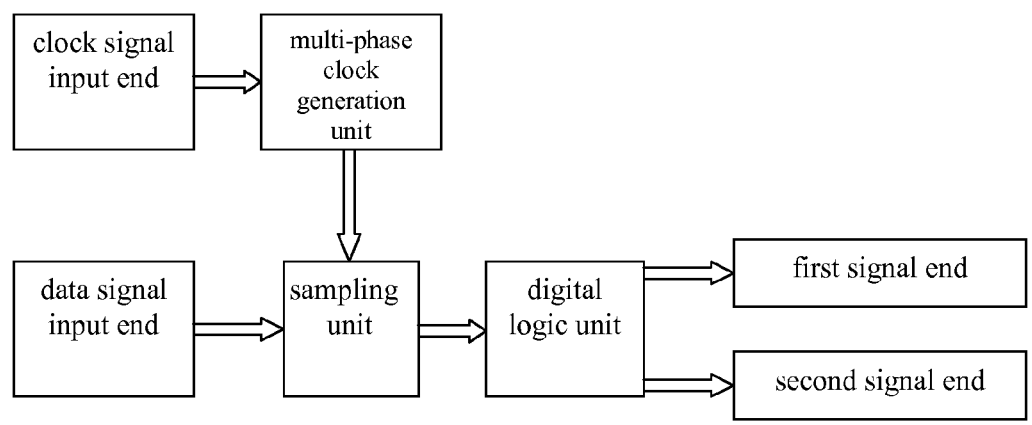
FIG. 1 is a systematic block diagram of a frequency detector according to a preferred embodiment of the present invention.

Referring to FIG. 1 of the drawings, a frequency detector, according to a preferred embodiment of the present invention, comprises a clock signal input end, a data signal input end, a multi-phase clock generation unit connected to the clock signal input end, a sampling unit connecting the multi-phase clock generation unit to the data signal input end, a digital logic unit connected to the sampling unit, and a first signal end and a second signal end connected to the digital logic unit.

The clock signal input end is for inputting a single-phase clock, and the multi-phase clock generation unit is for transforming the single-phase clock inputted by the clock signal input end into a multi-phase clock. The data signal input end is for inputting random data, and each data bit of the random data is divided into several sampling intervals according to a phase number of the multi-phase clock. The sampling unit samples the random data inputted by the data signal input end with the multi-phase clock generated by the multi-phase clock generation unit. The digital logic unit logically analyzes sampling values outputted by the sampling unit, judges the corresponding sampling interval of each sampling value so as to judge phase relationships between data edges of the inputted random data and each phase clock, and outputs signals for indicating a higher or lower frequency based on differences in the corresponding sampling intervals of the sampling values at two adjacent times. The first signal end is for outputting an UP signal to indicate the relatively higher frequency, and the second signal end is for outputting a DN signals to indicate the relatively lower frequency. If the corresponding sampling intervals of the sampling values at the two adjacent times change along a first direction in which the random data are transmitted, the first signal end outputs a first signal for indicating that the frequency of the inputted random data, Data, is higher than the frequency of the reference clock. If the corresponding sampling intervals of the sampling values at the two adjacent times change along a second direction opposite to the first direction, the second signal end outputs a second signal for indicating that the frequency of the inputted random data, Data, is lower than the frequency of the reference clock.

Figure 2:
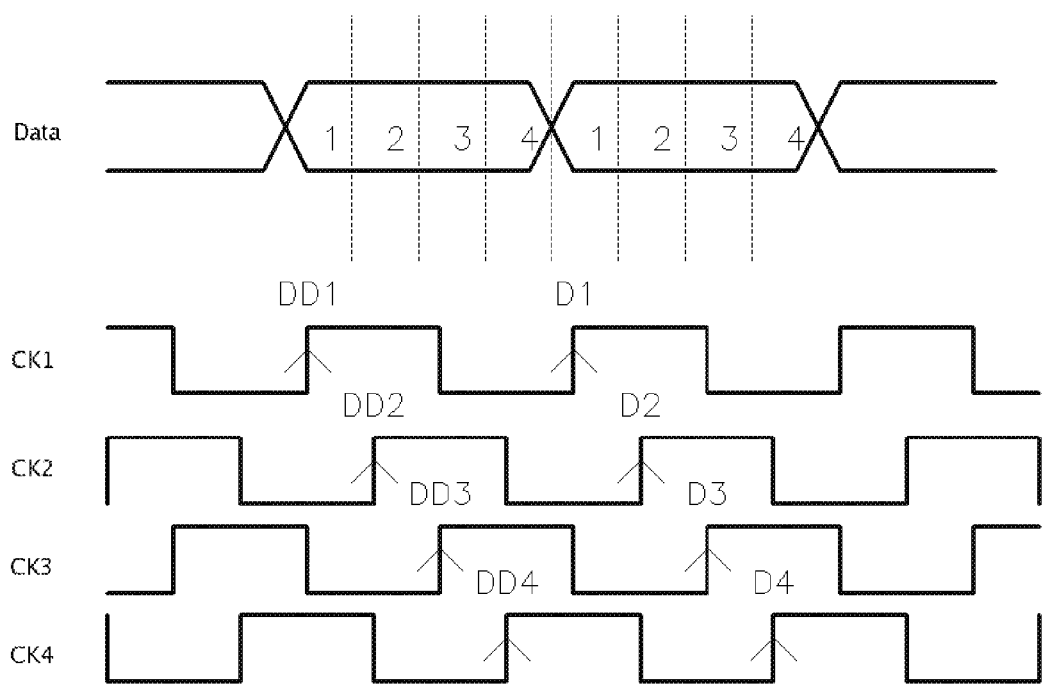
FIG. 2 is a sketch view of wave of the frequency detector according to the preferred embodiment of the present invention.
Figure 4:
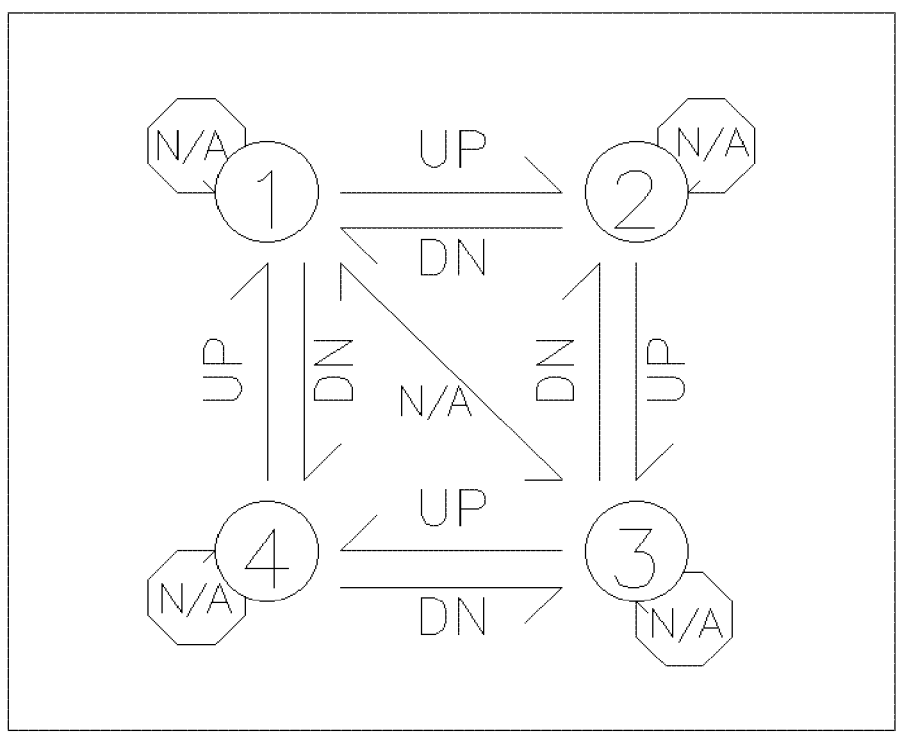
FIG. 4 is a sketch view of working principles of the frequency detector according to the preferred embodiment of the present invention.

Referring to the drawings from FIG. 2 to FIG. 4, according to the preferred embodiment, the clock signal input end inputs a single-phase reference clock. Four-phase reference clocks, CK1, CK2, CK3 and CK4, are generated after the single-phase reference clock passes through the multi-phase clock generation unit. Random data, Data, are inputted by the data signal input end and divided into four sampling intervals 1, 2, 3 and 4. The sampling unit samples the random data, Data, by rising edges of the four-phase reference clocks, CK1, CK2, CK3 and CK4, and outputs a sampling value at a current time to the digital logic unit.

Referring to FIG. 3, a sketch view of a state of each sampling value and a corresponding sampling interval S(N) thereof, the sampling values are sampled through five adjacent rising edges of the four-phase reference clocks CK1, CK2, CK3 and CK4. According to the preferred embodiment, the sampling values, sampled by the five adjacent rising edges DD4, D1, D2, D3 and D4 in FIG. 2, are adopted to judge. As shown in FIG. 3, when the sampling value is "01111" or "10000", the corresponding sampling interval S(N) is the sampling interval 1; when the sampling value is "00111" or "11000", the corresponding sampling interval S(N) is the sampling interval 2; when the sampling value is "00011" or "11100", the corresponding sampling interval S(N) is the sampling interval 3; when the sampling value is "00001" or "11110", the corresponding sampling interval S(N) is the sampling interval 4; in other cases, the corresponding sampling interval S(N) stays the same, i.e., a sampling interval S(N−1).

The digital logic unit firstly judges the corresponding sampling interval of the sampling value at the current time, and then judges the corresponding sampling interval of the sampling value at a next time based on the sampling value sampled by the sampling unit at the next time. In a same manner, supposing that the sampling value at the current time belongs to the sampling interval 1 and the sampling value at the next time belongs to the sampling interval 2, the digital logic unit judges that the first frequency of the inputted random data, Data, is higher than the second frequency of the reference clock, and outputs the UP signal indicating the relatively higher frequency through the first signal end; supposing that the sampling value at the current time belongs to the sampling interval 4 and the sampling value at the next time belongs to the sampling interval 3, the digital logic unit judges that the frequency of the inputted random data, Data, is lower than the frequency of the reference clock, and outputs the DN signal indicating the relatively lower frequency through the second signal end; if the sampling values at the two adjacent times belongs to the same sampling interval, the digital logic unit does not output any signal.

Figure 5:
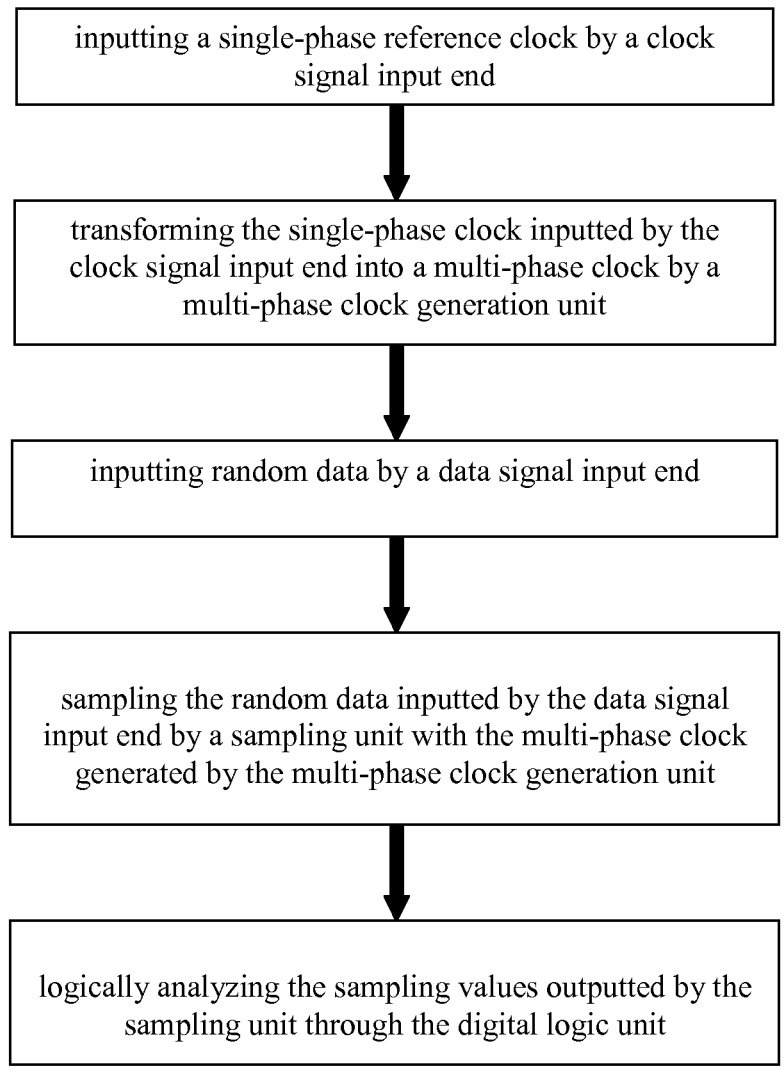
FIG. 5 is a flow chart of the frequency detector according to the preferred embodiment of the present invention.

Referring to FIG. 5, a method for detecting frequencies comprises the following steps:

(1) inputting a single-phase reference clock by a clock signal input end;

(2) transforming the single-phase clock inputted by the clock signal input end into a multi-phase clock by a multi-phase clock generation unit;

(3) inputting random data by a data signal input end and dividing each data bit of the random data into several sampling intervals according to a phase number of the multi-phase clock;

(4) sampling the random data inputted by the data signal input end by a sampling unit with the multi-phase clock generated by the multi-phase clock generation unit, and outputting sampling values of each time to a digital logic unit;

(5) logically analyzing the sampling values outputted by the sampling unit, judging the corresponding sampling interval of each sampling value and outputting signals for indicating a relatively higher or lower frequency based on differences in the corresponding sampling intervals of the sampling values at two adjacent times.

The present invention provides a frequency detector and a method for detecting frequencies with a fast speed in detecting frequencies, a strong anti-interference ability and small errors.

What is claimed is:

1. A frequency detector, comprising a multi-phase clock generation unit, a sampling unit connected to said multi-phase clock generation unit and a digital logic unit connected to said sampling unit, wherein said multi-phase clock generation unit receives an inputted single-phase clock and transforms said inputted single-phase clock into a multi-phase clock, said sampling unit receives inputted random data and samples said random data with said multi-phase clock generated by said multi-phase clock generation unit, each data bit of said random data is divided into several sampling intervals according to a phase number of said multi-phase clock, said digital logic unit logically analyzes sampling values outputted by said sampling unit, judges said corresponding sampling interval of each sampling value and outputs a signal for indicating that a frequency of said random data is higher or lower than said frequency of said single-phase clock based on differences in said corresponding sampling intervals of sampling values at two adjacent times;

further comprising a clock signal input end connected to said multi-phase clock generation unit and a data signal input end connected to said sampling unit, wherein said clock signal input end inputs said single-phase clock, said data signal input end inputs said random data; and further comprising a first signal end and a second signal end, connected to said digital logic unit, wherein said first signal end is for outputting a first signal for indicating that said frequency of said random data is higher than said frequency of said single-phase clock, said second signal end is for outputting a second signal for indicating that said frequency of said random data is lower than said frequency of said single-phase clock.

2. The frequency detector, as recited in claim 1, wherein, if said corresponding sampling intervals of said sampling values at two adjacent times change along a first direction in which said random data are transmitted, said first signal end outputs said first signal for indicating that said frequency of said random data is higher than said frequency of said single-phase clock.

3. The frequency detector, as recited in claim 2, wherein, if said corresponding sampling intervals of said sampling values at two adjacent times change along a second direction opposite to said first direction, said second signal end outputs said second signal for indicating that said frequency of said random data is lower than said frequency of said single-phase clock.

4. A frequency detector, comprising a multi-phase clock generation unit, a sampling unit connected to said multi-phase clock generation unit and a digital logic unit connected to said sampling unit, wherein said multi-phase clock generation unit receives an inputted single-phase clock and transforms said inputted single-phase clock into a multi-phase clock, said sampling unit receives inputted random data and samples said random data with said multi-phase clock generated by said multi-phase clock generation unit, each data bit of said random data is divided into several sampling intervals according to a phase number of said multi-phase clock, said digital logic unit logically analyzes sampling values outputted by said sampling unit, judges said corresponding sampling interval of each sampling value and outputs a signal for indicating that a frequency of said random data is higher or lower than said frequency of said single-phase clock based on differences in said corresponding sampling intervals of sampling values at two adjacent times;

further comprising a first signal end and a second signal end, connected to said digital logic unit, wherein said first signal end is for outputting a first signal for indicating that said frequency of said random data is higher than said frequency of said single-phase clock, said second signal end is for outputting a second signal for indicating that said frequency of said random data is lower than said frequency of said single-phase clock;

wherein, if said corresponding sampling intervals of said sampling values at two adjacent times change along a first direction in which said random data are transmitted, said first signal end outputs said first signal for indicating that said frequency of said random data is higher than said frequency of said single-phase clock.

5. The frequency detector, as recited in claim 4, wherein, if said corresponding sampling intervals of said sampling values at two adjacent times change along a second direction opposite to said first direction, said second signal end outputs said second signal for indicating that said frequency of said random data is lower than said frequency of said single-phase clock.

6. A method for detecting frequency, comprising following steps:
   (1) inputting a single-phase clock by a clock signal input end to a multi-phase clock generation unit;
   (2) transforming the single-phase clock into a multi-phase clock by the multi-phase clock generation unit;
   (3) inputting random data by a data signal input end and dividing each data bit of the random data into several sampling intervals according to a phase number of the multi-phases clock;
   (4) sampling the random data inputted by the data signal input end by a sampling unit with the multi-phase clock generated by the multi-phase clock generation unit, and outputting sampling values of each time to a digital logic unit; and
   (5) logically analyzing the sampling values outputted by the sampling unit, judging the corresponding sampling interval of each sampling value and outputting a signal for indicating a relatively higher or lower frequency based on differences in the corresponding sampling intervals of the sampling values at two adjacent times;

wherein, if the corresponding sampling intervals of the sampling values at two adjacent times change along a first direction in which the random data are transmitted, a first signal end outputs a first signal for indicating that a frequency of the random data is higher than a frequency of the single-phase clock.

7. The method for detecting frequency, as recited in claim 6, wherein, if the corresponding sampling intervals of the sampling values at two adjacent times change along a second direction opposite to the first direction, a second signal end outputs a second signal for indicating that the frequency of the random data is lower than the frequency of the single-phase clock.

* * * * *